(12) United States Patent
Levedahl

(10) Patent No.: US 7,092,924 B1
(45) Date of Patent: Aug. 15, 2006

(54) METHOD AND SYSTEM FOR ASSIGNING OBSERVATIONS

(75) Inventor: Mark D. Levedahl, McLean, VA (US)

(73) Assignee: Raytheon Company, Waltham, MA (US)

( * ) Notice: Subject to any disclaimer, the term of this patent is extended or adjusted under 35 U.S.C. 154(b) by 877 days.

(21) Appl. No.: 10/086,988

(22) Filed: Feb. 28, 2002

(51) Int. Cl.
*G06N 5/00* (2006.01)

(52) U.S. Cl. .................... 706/45; 382/107; 382/103

(58) Field of Classification Search .............. 706/1, 706/45; 382/103, 107, 159; 707/6; 84/600; 701/209
See application file for complete search history.

(56) References Cited

U.S. PATENT DOCUMENTS

| | | | | |
|---|---|---|---|---|
| 5,522,063 A | * | 5/1996 | Ashar et al. .................. 716/4 |
| 5,963,447 A | * | 10/1999 | Kohn et al. .................. 700/49 |
| 6,000,833 A | * | 12/1999 | Gershenfeld et al. .......... 84/600 |
| 6,058,206 A | * | 5/2000 | Kortge ........................ 382/159 |
| 6,085,147 A | * | 7/2000 | Myers ........................ 701/209 |
| 6,092,065 A | * | 7/2000 | Floratos et al. .................. 707/6 |
| 6,205,444 B1 | * | 3/2001 | Floratos et al. .................. 707/6 |
| 6,385,245 B1 | * | 5/2002 | De Haan et al. ........ 375/240.16 |
| 6,480,991 B1 | * | 11/2002 | Cho et al. ........................ 716/8 |
| 6,683,968 B1 | * | 1/2004 | Pavlovic et al. ............ 382/103 |
| 6,694,044 B1 | * | 2/2004 | Pavlovic et al. ............ 382/107 |

* cited by examiner

*Primary Examiner*—Wilbert L. Starks, Jr.
(74) *Attorney, Agent, or Firm*—Baker Botts L.L.P.

(57) ABSTRACT

According to one embodiment of the invention, a computerized method for assigning observations includes receiving a plurality of first observations indicative of respective physical parameters observed by a first sensor system and receiving a plurality of second observations indicative of respective physical parameters observed by a second sensor system. The method also includes assigning, by a computer, a set of pairs of the first and second observations predicted to correspond to the same physical parameter. The assigning includes receiving a cost function that specifies a cost for each assigned pair. The cost is not independent of the assignment of any other assigned pairs in the set of assigned pairs. The assigning also includes determining the set of assigned pairs corresponding to an optimal value for the cost function by calculating, by the computer, a corresponding optimal value for a directed graph representative of possible assignments of first and second observations.

40 Claims, 9 Drawing Sheets

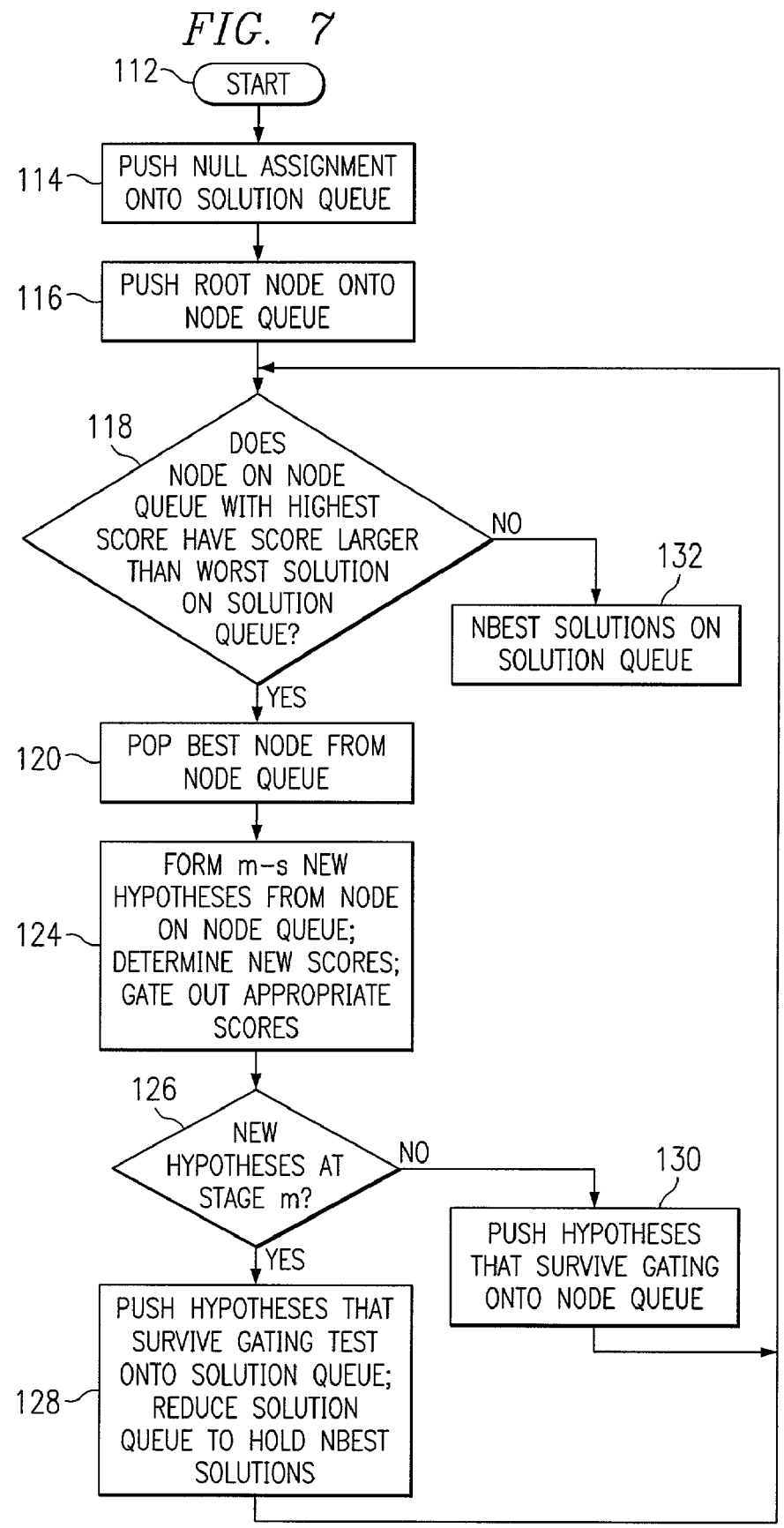

METHOD AND SYSTEM FOR ASSIGNING OBSERVATIONS

TECHNICAL FIELD OF THE INVENTION

This invention relates generally to data analysis and more particularly to a method and system for assigning observations.

BACKGROUND OF THE INVENTION

The problem of associating sets of observations from two sensor systems in the presence of bias, random errors, false alarms, and misdetections is fundamental in multi-sensor tracking systems. For example, if two sensor systems are tracking a plurality of airplanes, each sensor system develops tracks based on what is seen in the sky. One tracking system may want to share data with the other system and transmits its current picture of what it sees to the other system. The second system must determine what it has received from the first system. In particular, it must determine which data points received from the first sensor system correspond to the airplanes it is tracking in its current system. This is difficult because each sensor system has associated error, which makes it difficult to assign a data point from one sensor system to the other. Examples of errors may include misalignment between the two sensor systems, different levels of tolerances, and the fact that one system may see certain airplanes that the other does not. As described above, each particular system may have errors due to bias, random errors, false alarms, and misdetections. Therefore it is difficult to simply use a set of data received from the first sensor system and overlay it with the second sensor system.

Common approaches to this problem are described in Blackman, S. and R. Popoli, *Design and Analysis of Modern Tracking Systems*, Artech House, Norwood, Mass., 1999. In general, these methods involve separate steps to first determine and correct for persistent bias within either of the sensor systems. Persistent bias refers to a consistent bias, such as incorrectly measuring a distance by the same distance each time. The second step is to perform an optimal assignment of the two sets of data, which are now assumed to include only random errors. This second step of optimally assigning the two sets of data is referred to as the global nearest neighbor (GNN) problem, and is commonly solved using either Bertsekas's auction algorithm, as described in Bertsekas, D. P., "The Auction Algorithm for Assignment and Other Network Flow Problems: A Tutorial," Interfaces, Vol. 20, pp. 133–149, 1990, or a JVC algorithm to minimize assignment costs based upon Mahalanobis (or chi-square) distances between the observations after bias removal. The JVC algorithm is described in Drummond, O. E., D. A. Castanon and M. S. Bellovin, "Comparison of 2-D Assignment Algorithms for Rectangular, Floating Point Cost Matrices," Proc. of SDI Panels on Tracking, No. 4, pp. 81–97, December 1990, and Jonker, R. and A. Volgenant, "A Shortest Augmenting Path Algorithms for Dense and Sparse Linear Assignment Problems," Computing, Vol. 39, pp. 325–340, 1987.

A problem with these approaches is that the global nearest neighbor problem assumes alignment between the two sensor systems is good such that (i) errors between observations of the sensor system of the same object are purely random (Gaussian distributed), and (ii) errors and observations of one object are completely independent of errors and observations of other objects. However, because of these assumptions, this approach does not address a persistent bias, also referred to as registration error, between the two sensor systems, which is often actually the case. For example, a first measurement system might be rotated 30 degrees off of a second measurement system. The global nearest neighbor formulation works best when both systems hold observations on the same objects and can tolerate large biases in this restrictive circumstance. In the more realistic case wherein each system holds some observations the other lacks, the global nearest neighbor formulation works well only if there are no bias errors. Many techniques exist to determine and remove the bias errors prior to attempting assignment. Often, these use comparison of observations on well separated airplanes where the correct assignment is unambiguous.

Image processing techniques have also been applied to the problem of assigning sets of observations from two sensor systems. In that approach, each set of data is treated as an image and a peak correlation is attempted to be found using a Fast Fourier transform and convolutions. This results in a bias between the two systems. The bias is removed and the unbiased problem is solved using the GNN approach described above. However, in this approach the bias is cured independent of making assignments and is therefore not necessarily calculated appropriately. As a result, one cannot show that the determined solution is a maximum likelihood solution.

In Kenefic, R. J., "Local and Remote Track File Registration Using Minimum Description Length," IEEE Trans. on *Aerospace and Electronic Systems*, Vol. AES-29, No. 3, July 1993, pp. 651–655, Kenefic postulated a formulation of the observation assignment problem that incorporates a cost function that accounts for both bias and random errors together. However, Kenefic offered no efficient algorithm to solve the problem.

SUMMARY OF THE INVENTION

According to one embodiment of the invention, a computerized method for assigning observations includes receiving a plurality of first observations indicative of respective physical parameters observed by a first sensor system and receiving a plurality of second observations indicative of respective physical parameters observed by a second sensor system. The method also includes assigning, by a computer, a set of pairs of the first and second observations predicted to correspond to the same physical parameter. The assigning includes receiving a cost function that specifies a cost for each assigned pair. The cost is not independent of the assignment of any other assigned pairs in the set of assigned pairs. The assigning also includes determining the set of assigned pairs corresponding to an optimal value for the cost function by calculating, by the computer, a corresponding optimal value for a directed graph representative of possible assignments of first and second observations.

Some embodiments of the invention provide numerous technical advantages. Some embodiments may benefit from some, none, or all of these advantages. An efficient algorithm is provided for assigning sets of observations that accounts for both registration errors and nodes that should not be assigned. Such an approach may result in more accurate assignment of observations in a more efficient manner than conventional techniques.

Other technical advantages may be readily ascertainable by one of skill in the art.

BRIEF DESCRIPTION OF THE DRAWINGS

Reference is now made to the following description taken in conjunction with the accompanying drawings, wherein like reference numbers represent like parts, and which:

FIG. 7 is a flow chart illustrating example acts associated with solving the directed graph of FIG. 5B;

DETAILED DESCRIPTION OF THE INVENTION

Embodiments of the invention and its advantages are best understood by referring to FIGS. 1 through 12 of the drawings, like numerals being used for like and corresponding parts of the various drawings.

Figure 1:
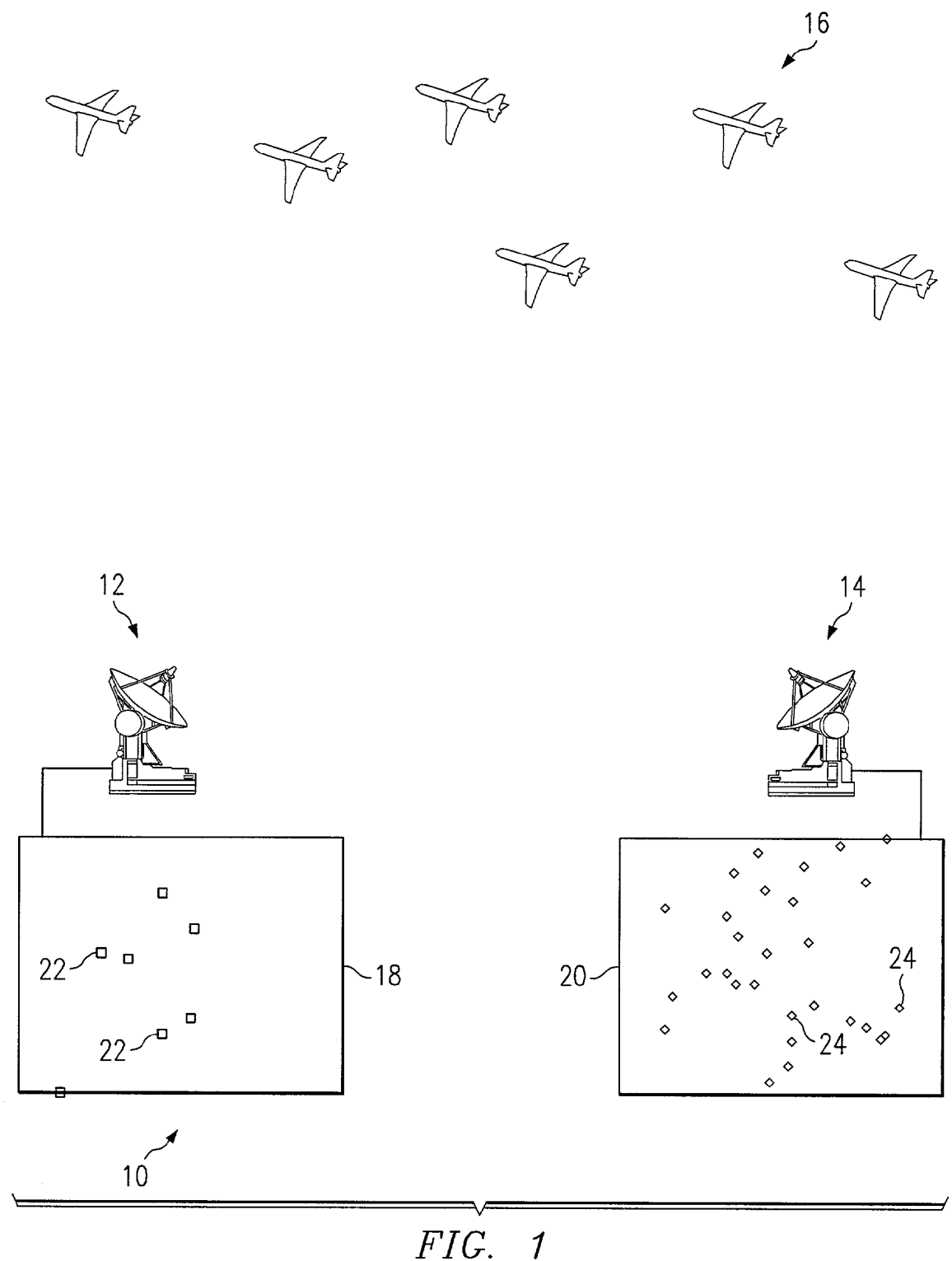
FIG. 1 is a schematic diagram of a sensor system that may benefit from the teachings of the invention.

FIG. 1 is a schematic diagram of sensor systems 10 that may benefit from the teachings of the invention. Sensor systems 10 include a sensor system 12 and a sensor system 14. In this example, sensor systems 12 and 14 observe the position of a plurality of airplanes 16. Observation may occur through sensing, prediction, or a combination of sensing and prediction. In this example, sensor system 12 and 14 are radar systems for example purposes only; however, the teachings of the invention are applicable regardless of the type of sensor system utilized. For clarity of illustration purposes not all airplanes 16 that are utilized in this example are illustrated in FIG. 1.

Associated with, or included within, sensor system 12 is a representation 18 of the location of airplanes 16 that are observed by sensor system 12. Sensor system 14 is associated with a similar representation 20. Representations 18 and 20 may differ for a variety of reasons. There may be misalignment between systems 12 and 14, errors between systems 12 and 14, or one system may not observe all of airplanes 16 that the other system observes. The errors for either system 12 or 14 may be due to bias, random errors, false alarms, misdetections, or other sources. Representation 18 includes a plurality of observations 22 representing the corresponding airplanes 16 observed by sensor system 12. Representation 20 includes a plurality of observations 24 representing the location of corresponding airplanes 16 observed by sensor system 14. The physical location of any airplane 16 is an example of a physical parameter, observation of which is represented by observations 22 and 24.

It may be desirable for sensor system 12 to provide observations 22 to sensor system 14 for use by sensor system 14. A problem that arises from this sharing of observations is correlating which observations 24 correspond to which observations 22. This may be particularly difficult in the situation where sensor system 12 includes observations 22 corresponding to airplanes 16 that sensor system 14 does not also observe. Persistent bias within or between sensor systems 12 and 14 also makes this problem particularly difficult.

According to the teachings of the invention, observations 22 are assigned to observations 24 by calculating a cost function indicative of differences between observed values 22 and observed values 24. An optimal value for the cost function is arrived at by solution of a directed graph representing the assignment of observations 22 to observations 24. According to one particular embodiment the cost function is such that the cost of making a particular assignment of a pair of observations is dependent upon an overall hypothesis for all assignments. A directed graph is a set of nodes connected by arcs, with each arc having a specific direction. Traversal of the graph is possible only in the direction of the arcs. The shortest path between two nodes in a graph is often determined using a dynamic program such as described in Dijkstra, E., "A note on two problems in connexion with graphs," *Numerische Mathematik* 1, pp. 269–271, 1959, which is incorporated herein by reference for all purposes. Other dynamic programs, also referred to as network shortest path algorithms, may also be used to solve a directed graph.

Figure 2:
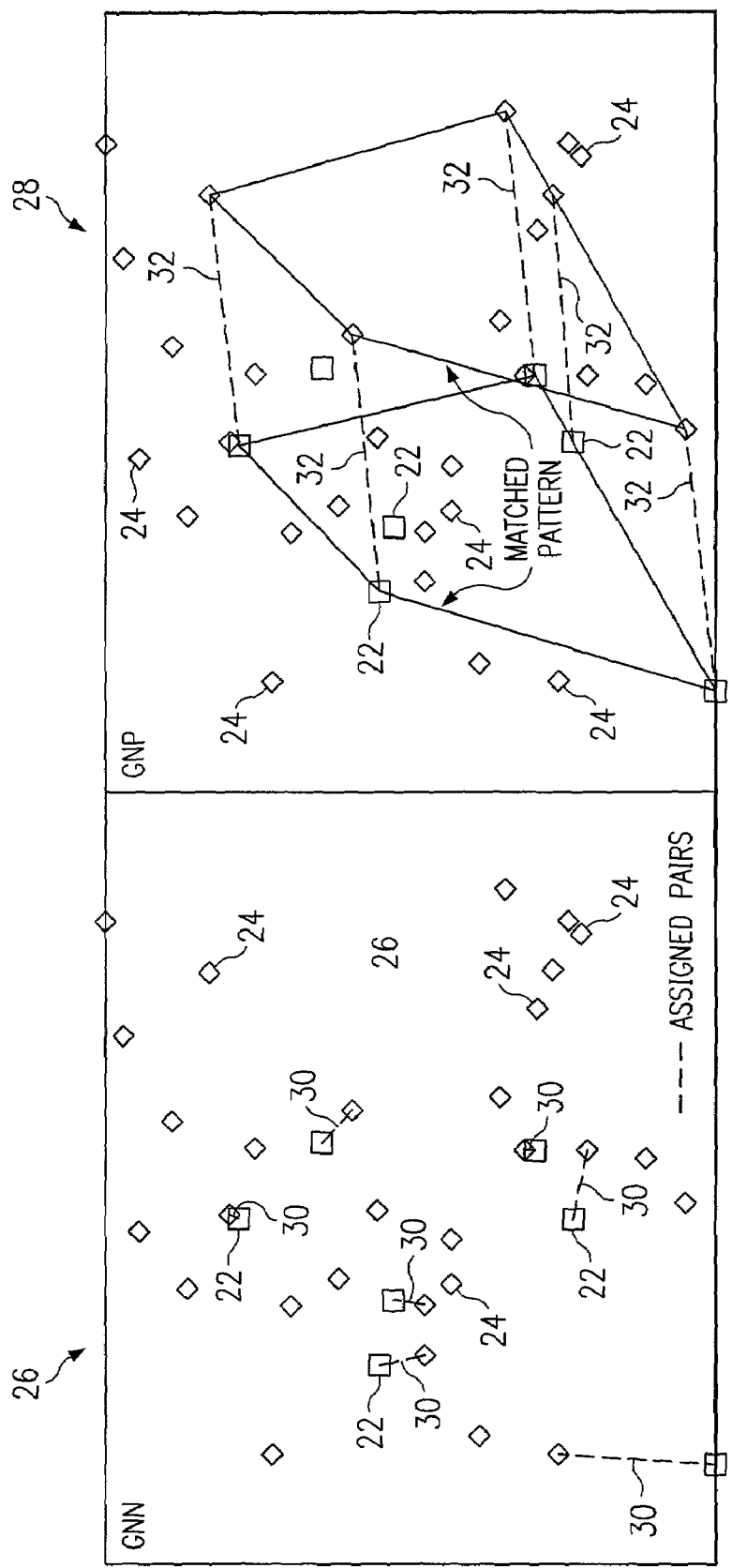
FIG. 2 is a schematic diagram comparing assignments of the data observations made by the system of FIG. 1 according to conventional techniques and according to the teachings of the invention.

FIG. 2 is a schematic diagram comparing assignments of the data observations 22 and 24 made by systems 10 of FIG. 1 according to conventional techniques and according to the teachings of the invention. Included in FIG. 2 is data set 26 and a data set 28. Data set 26 includes observations 22, observations 24, and a plurality of assignments 30 associating observations 22 with observations 24 predicted to correspond to the same physical parameter (i.e. the location of a given airplane 16). Such assignments are made in data set 26 according to conventional techniques. As described above, conventional techniques make various assumptions that are often incorrect in practice and therefore lead to erroneous assignments. Data set 28 includes observations 22, observations 24, and a plurality of assignments 32 corresponding to associations made between observations 22 and observations 24 predicted to correspond to the same physical parameter. These assignments are made according to the teachings of the invention. In this embodiment, the assignments in data set 28 account for both random and correlated bias components.

In data set 26, all errors are uncorrelated so each observation 22 is assigned to the nearest observation 24. In this example all examples are wrong. By contrast, assignments 32 of data set 28, generated according to the teachings of the invention, are made by recognizing errors have both random and correlated bias components, generating a common pattern, and assigning observations 22 to observations 24 accordingly. In this example a persistent offset exists between observations 22 and observations 24, as indicated in FIG. 2. All assignments in dataset 28 are correct.

Techniques for formulating such an observation assignment problem to include both persistent registration errors as well as the possibility that not all observations 22 are included within observations 24 are described below in conjunction with FIG. 3. Solution of the formulated problem is described in greater detail below in conjunction with FIGS. 4 through 7. FIGS. 8 through 12 illustrate example results and comparisons to prior techniques.

Figure 3:
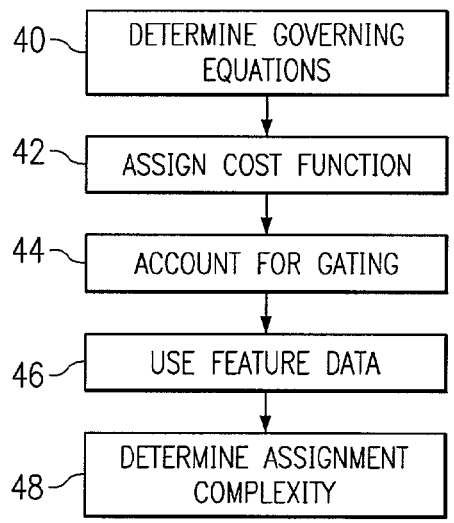
FIG. 3 is a flow chart illustrating acts associated with definition of an observation assignment problem according to the teachings of the invention.

FIG. 3 is a flow chart illustrating acts associated with definition of an observation assignment problem according to the teachings of the invention. Such an observation assignment problem is referred to herein as a global nearest pattern (GNP) problem and accounts for persistent errors and the possibility that observations to be assigned may not constitute a perfect subset of the observation set to which they are being assigned. The formulation of the GNP problem includes the following steps: determination of governing equations 40, assignment of the cost function 42, accounting for gating 44, use of feature data 46, and determination of assignment complexity 48.

At step 40, the governing equations are formulated. Assume that there are N objects (airplanes 16 in this example) in space being observed by systems A (system 12 in the example of FIG. 1) and B (system 14 in the example of FIG. 1), and each system observes a potentially different subset of the objects. A develops observations (observations 22 in the example of FIG. 1) on m of these, B develops observations (observations 24 in the example of FIG. 1) on n of these subject to:

$$m \leq n \leq N \quad (1)$$

False alarms in A or B correspond to observations of an object unobserved by the other system. The observations are converted to an M-dimensional common reference frame. In this frame, $$A_i = X_{Lx(i)} + G(P_i) + \bar{x}_A; i = 1 Km$$

$$B_j = X_{jx(j)} + G(Q_j) + \bar{x}_B; j = 1 Kn \quad (2)$$

where:

| | |
|---|---|
| A | set of m observations made by system A (each is a length M state vector) |
| B | set of n observations made by system B (each is a length M state vector) |
| X | true locations of the N objects (each is a length M state vector) |
| ix | length m vector defining the indices of the m objects in X for which A develops observations |
| jx | length n vector defining the indices of the n objects in X for which B develops observations |
| P | set of m MxM covariance matrices defining random errors in each of them observations in A |
| Q | set of n MxM covariance matrices defining random errors in each of the m observations in B |
| G(v) | length M vector of Gaussian random numbers, 0 mean, variance V |
| $\bar{x}_A, \bar{x}_B$ | length M bias vectors |

The GNP assignment problem developed ultimately relies only upon the relative errors between the sets of observations, hence the covariance of the relative bias is needed. The relative registration covariance matrix is defined as $$R = E([\bar{x}_A - \bar{x}_B][\bar{x}_A - \bar{x}_B])^T \quad (3)$$

The assignment problem is to determine the correct association of observations in A and B. The desire is that $A_i$ is mapped to $B_j$ given that ix(i)=jx (j), and that elements of A corresponding to an object unobserved by B be unassigned. All assignments are unique, hence each observation in A or B can be assigned to either 0 or 1 observations in the other set. The assignment is expressed by the length m integer assignment vector a with properties:

a(i)>0$A_i$ is assigned to $B_{a(i)}$ a(i)=0$A_i$ is unassigned  (4)

The uniqueness property is expressed as a(i)≠a(j)∀(i≠j and a(j)>0)  (5)

After the governing equations are formulated at step 40 a cost function is assigned at step 42. Assuming that all items in A are assigned and following standard approaches for track-to-track association, the Gaussian probability density for a given assignment set is given by:

$$P_a = \frac{e^{-\bar{x}R^{-1}\bar{x}^T/2}}{(2\pi)^{M/2}\sqrt{|R|}} \prod_i^m \frac{e^{-[A_i - B_{a(i)} - \bar{x}](P_i + Q_{a(i)})^{-1}[A_i - B_{a(i)} - \bar{x}]^T/2}}{(2\pi)^{M/2}\sqrt{|P_i + Q_{a(i)}|}} \quad (6)$$

where $\bar{x}$ is an estimate of the relative bias $\bar{x}_A - \bar{x}_B$. A term referred to as an assignment gate is utilized to account for unassigned elements in a and taking the negative logarithm of both sides and multiplying by Equation 2 yields the hypothesis score ($J_a$) to be maximized through choice of a:

$$\delta x_i = A_i - B_{a(i)} - \bar{x} \quad (7)$$

$$S_i = P_i + Q_{a(i)}$$

$$J_a = -\bar{x}R^{-1}\bar{x} - \ln[(2\pi)^M|R|] - \sum_{i=1}^m \left\{ \begin{array}{ll} \delta x_i S_i^{-1} \delta x_i^T + \ln[|S_i|] & a(i) \neq 0 \\ g & a(i) = 0 \end{array} \right\}$$

Equation 7 assumes at least one assignment in a, and the value g, which used in deciding to accept a given assignment: g includes the missing Mln(2π) term and is described in greater detail below. The bias estimate, $\bar{x}$, is chosen to maximize the assignment score, represented by $J_a$. The value for this is determined by taking the partial derivative of equation 7 with respect to x, setting the result to zero, and solving, resulting in:

$$\bar{x} = \left( \sum_{i=1}^m \left\{ \begin{array}{ll} [A_i - B_{a_i}][P_i + Q_{a_i}]^{-1} & a(i) \neq 0 \\ 0 & a(i) = 0 \end{array} \right\} \right) \left( R^{-1} + \sum_{i=1}^m [P_i + Q_{a_i}]^{-1} \right)^{-1} \quad (8)$$

Again, the bias is computed based upon the assigned elements only. With no assignments made, the bias is indeterminate. Equations 7 and 8 utilize a simple bias, but could be easily reformulated with a functional bias, such as a hyperbolic displacement as a function of relative position. Other types of bias that may be accounted for include scale factor errors and rotation errors. Equations 7 and 8 together define the assignment score function that a GNP assignment algorithm must maximize. A simplification is available in the special case of homogeneous error variances (e.g., all $P_i = P$ and all $Q_j = Q$.) In this case, equation 8 becomes:

$$\bar{x}_{cv} = [n_a I_M + (P+Q)R^{-1}]^{-1} \sum_{i=1}^{m} \left\{ \begin{array}{ll} A_i - B_{a_i} & a(i) \neq 0 \\ 0 & a(i) = 0 \end{array} \right\} \quad (9)$$

$n_a$: number of non-zero entries in a

It is noteworthy that the costs in equation 7 do not support generation of a cost matrix as in the classic GNN problem. Rather, the cost of any particular assignment $a(i)=j$ is dependent upon the bias estimate and hence upon the entire assignment hypothesis. The entire assignment hypothesis refers to a hypothesized set of all assignments. The integer programming methods used to solve the GNN problem are based upon independent costs for each assignment and hence incapable of handling the GNP problem. This is a feature of the GNP problem that utilizes the teachings of a new invention for solution.

An "equivalent" cost function for the GNN problem is defined here. This can be a rough equivalent only, as the bias is ignored (the assumption being that the bias is zero). The GNN formulation is in fact found by removing the bias related terms from equation 7, with result in:

$$J_{gnn} = -\sum_{i=1}^{m} \left\{ \begin{array}{ll} [A_i - B_{a(i)}]S_i^{-1}[A_i - B_{a(i)}]^T + \ln[|S_i|] & a(i) \neq 0 \\ g & a(i) = 0 \end{array} \right\} \quad (10)$$

In general, the residual covariance Si in equation 10 would be inflated to account for residual bias errors.

After assignment of a cost function at step 42, gating is accounted for at step 44. Gating refers to accounting for non-assignment of an observation, such as observation 22 to an observation in second system 14. For any potential assignment $a(i)=j$, there are two hypotheses:

---

$H_0$: $A_i$ and $B_j$ represent independent observations and $a(i) = j$ should be rejected in favor of $a(i) = 0$.
$H_1$: $A_i$ and $B_j$ represent the same object and $a(i) = j$ should be accepted.

---

The gate value g is used in the above test. Given the interdependence of all assignments in a hypothesis, a cost cannot be uniquely defined for any particular assignment. The gating approach presented here treats the change in score when an assignment is added to a set as the cost of that assignment, and hence the value tested against g to choose $H_0$ or $H_1$.

In the case where system A sends its full set of observations, the standard maximum likelihood gate used for the GNN problem is applicable but needs adjustment to allow for the extra term in equation 7 related to the bias. Given true target density over the surveillance volume $\beta_t$, false target densities for systems A and B are $\beta_{FTA}$ and $\beta_{FTB}$, and probabilities for A and B of observing a target are $P_{TA}$ and $P_{TB}$, the maximum likelihood gate value is (Blackman[2], equation 9.15):

$$g = 2\ln\left[\frac{\beta_t P_{TA} P_{TB}}{(2\pi)^{M/2} P_{NTA} P_{NTB}}\right]$$

$$PNTA = \beta_t P_{TB}(1-P_{TA}) + \beta_{FTB} \quad (11)$$

$$P_{NTB} = \beta_t P_{TA}(1-P_{TB}) + \beta_{FTA} \quad (11)$$

The GNP formulation is especially useful for a one-time object map handover. Typically, an object map has an a priori defined maximum number of elements, regardless of the true number of tracks present in the source. This corresponds to a lower $P_{TA}$ and thus indicates a smaller gate value may be required than is given by equation 11.

There are m+1 terms summed to give an assignment score in equation 7 as opposed to m terms in the GNN formulation of equation 10. The extra term is due to the bias error, and as the first assignment added to a hypothesis is primarily responsible for determining the bias, the solution approach here uses 2 g as the gating value for the first assignment. The direct impact of this decision is that entire hypotheses are less likely to be gated out given a large bias: gating out a single assignment that is marginal is acceptable, but gating out an entire hypothesis due to a large bias may not be acceptable.

After gating is accounted for at step 44, feature data may be used at step 46. The cost function given in equation 7 explicitly assumes that biases exist between the two systems in all dimensions of the common frame of reference. However, the formulation is easily expanded to include additional feature data and/or observations where the residual bias is unimportant (e.g., vehicle velocity). Assuming the feature observations are in arrays $A^f$ and $B^f$ with residual covariance $F_{ij}$, the hypothesis score becomes:

$$\delta f_i^2 [A_i^f - B_{a(i)}^f](F_{i,a(i)})^{-1}[A_i^f - B_{a(i)}^f]^t + \ln(|F_{i,a(i)}|)$$

$$J_{af} = -\bar{x}R^{-1}\bar{x} - \ln[(2\pi)^M |R|] - \quad (12)$$

$$\sum_{i=1}^{m} \left\{ \begin{array}{ll} \delta x_i S_i^{-1} \delta x_i^T + \ln[|S_i|] + \delta f_i^2 & a(i) \neq 0 \\ g & a(i) = 0 \end{array} \right\}$$

Assignment complexity may be determined at step 48 as follows. The upper limit on hypothesis to be tested is calculated from simple combination theory. The algorithm can choose to make k assignments, $0 \leq k \leq m$. There are $$\binom{m}{k}$$

ways of choosing the k objects from the smaller set for assignment. For each set, there are n ways to assign the first object, (n−1) ways to assign the second, hence $$\frac{n!}{(n-k)!}$$

ways of assigning the set. Overall, the total number of hypothesis that can potentially be considered is:

$$n_h = \sum_{k=0}^{m} \binom{m}{k} \frac{n!}{(n-k)!} \quad (13)$$

Each of the $n_h$ hypotheses requires m assignment decisions. A measure of algorithm efficiency is the fraction of assignment decisions explored to find the solution:

$$\eta = \frac{\varepsilon_a}{mn_h} \quad (14)$$

Figure 4:
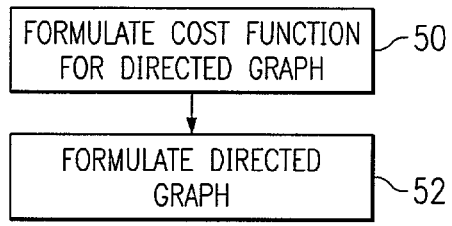
FIG. 4 is a flow chart showing acts associated with solution of the formulated problem of observation assignment according to the teachings of the invention.

FIG. 4 is a flow chart showing acts associated with solution of the formulated GNP problem according to the teachings of the invention. The flow chart of FIG. 4 includes a step 50 of formulating a cost function in a form suitable for a directed graph and a step 52 of formulating the directed graph.

The teachings of the invention recognize that a chosen algorithm for solving the GNP problem formulated and described with reference to FIG. 3 requires that scores be computable for partial hypotheses (e.g., for having made fewer than m assignment decisions), and that adding assignment decisions to a hypothesis always results in a same-sign change (non-positive in this example) in score. Therefore modifications to equation 7 are made to effect this condition. First, $d_{min}$ is defined as the minimum determinant of the residual error matrix $(P_i+Q_j)$ taken over all combinations of i and j. This constant value is added to all scores and subtracted from the gate value used. This adds a constant value to all hypotheses and so does not alter which has the minimum value. Also, the value $\ln([2\pi]^M|R|)$ is added to all hypotheses and subtracted from the gate value used on the first assignment.

The gate value used on the first assignment made in a hypothesis (e.g., first a(i)>0) is:

$$\bar{g}_1 = 2\bar{g} - 1n([2\pi]^M|R|) \quad (15)$$

The gate value used on the second and subsequent assignments in a hypothesis:

$$\bar{g} = g - 1n(d_{min}) \quad (16)$$

The score for a hypothesis at stage s, s is the number of assignment decisions made, with $n_a$ ($n_a$>0) assignments is:

$$J_s = -\bar{x}R^{-1}\bar{x}^T - \sum_{i=1}^{s} \left\{ \begin{matrix} \delta x_i S_i^{-1} \delta x_i^T + \ln[|S_i|] + \ln(d_{mm}) & a(i) \neq 0 \\ \bar{g} & a(i) = 0 \end{matrix} \right\} + \quad (17)$$

$$\left\{ \begin{matrix} \ln([2\pi]^M|R|) & n_a = 0 \\ 0 & n_a > 0 \end{matrix} \right\}$$

Thus an optimal value for the assignment score, $J_s$, according to Equation 17 is desired. According to the teachings of the invention, a directed graph may be formulated corresponding to Equation 17 and solved for an optimal value. In this case, an optimal value is a minimum value for $J_s$; however, according to other formulations an optimal value could take the form of a maximum value, or other suitable form.

Figure 5A:
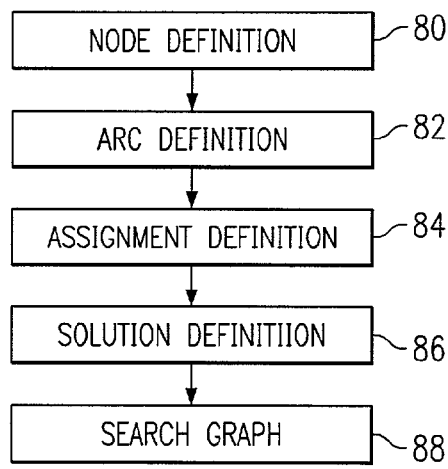
FIG. 5A is a flow chart showing steps associated with forming a directed graph for solution of the formulated observation assignment problem according to the teachings of the invention.
Figure 5B:
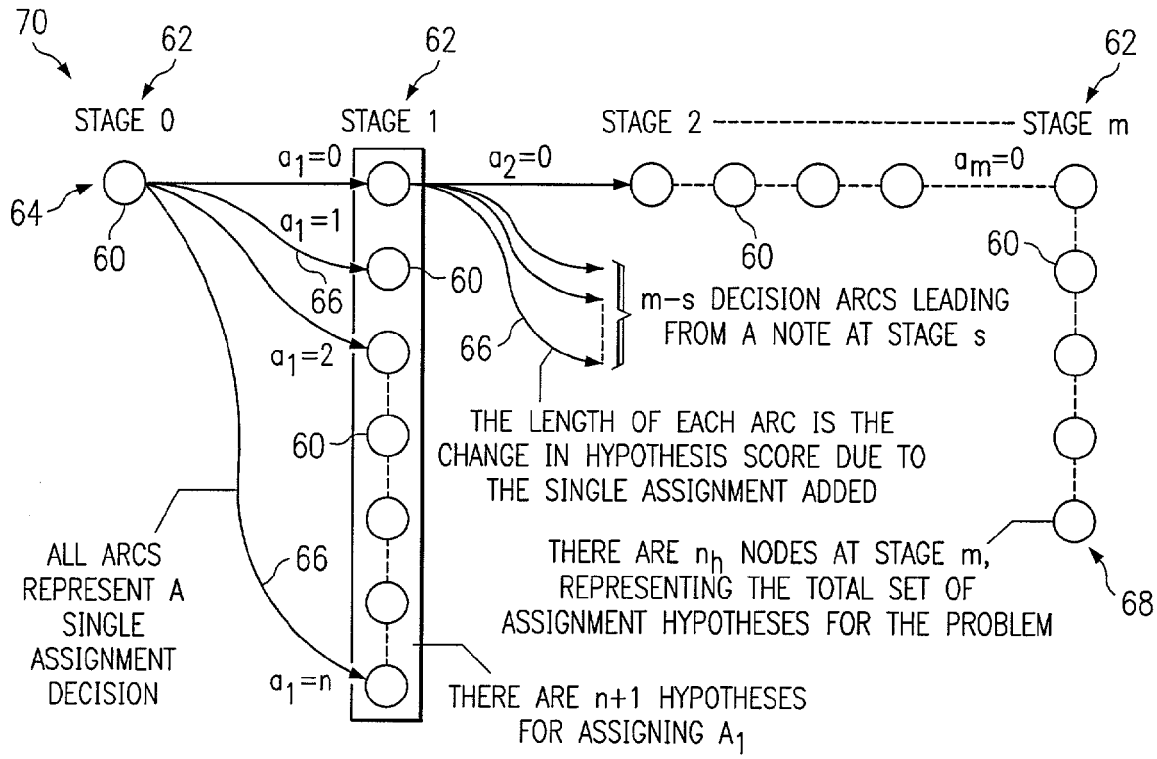
FIG. 5B is a directed graph for solving the formulated observation problem according to the teachings of the invention.

FIG. 5A is a flow chart showing steps associated with forming a directed graph for solution of the GNP problem according to the teachings of the invention, and FIG. 5B is a directed graph 70 for solving the GNP problem according to the teachings of the invention. Directed graph 70 includes a plurality of nodes 60. Each node 60 corresponds to the assignment of an observation from a first set of observations (observations 22) to a given one of observations in a second set (observations 24). Nodes 60 are arranged in stages 62, and directed graph 70 includes m+1 stages where m represents the number of observations in the set receiving data for assignment, which in this example corresponds to the number of observations 24. Each stage 62 includes n+1 nodes corresponding to the n+1 possible hypotheses for assignment. The node 60 at stage zero denoted by reference numeral 64, is referred to as a root node. All arcs 66 between given nodes 60 represent a single assignment decision. All nodes in stage m are referred to as terminal nodes 68.

With reference to FIG. 5A, formulation of directed graph 70 is described. At a step 80 nodes 60 in directed graph 70 are defined. Each node 60 in graph 70 represents an assignment hypothesis with some number of assignment decisions. Root node 64 has zero decisions made, and all terminal nodes 68 have m assignment decisions and are complete.

At step 82 arcs 66 in directed graph 70 are defined. Each node 62 in directed graph 70 has a single input arc 66. Therefore directed graph 70 is in effect a tree. There is exactly one path from root node 64 to any node 60 in graph 70. Each arc 66 connecting to node 60 represents a single assignment decision. Thus, each node 60 has one more assignment decision than the node 60 feeding it. A length of an arc 66 is, in this case, the decrease in assignment score $(J_{s-1}-J_s)$ resulting from the assignment decision made to reach the assignment hypothesis at its terminus.

At step 84, assignment definitions are made. Root node 64 has zero assignment decisions made. Arcs 66 into nodes at stage i correspond to assignment decisions on the item in A (system 12). For example, root node 64 feeds all stage one nodes, and the assignment decision made relates to assigning the first observation in A (observations 22) to the n observations in B (observations 24). All assignment hypotheses consist of unique assignments; the assignment decision associated with each arc 66 assigns an observation in B (observations 24) that is unassigned in the source hypothesis. The structure of graph 70 assures that each observation in A (observations 22) is considered only in a single stage 62 and cannot be multiply assigned.

At step 86, a solution of graph 70 is defined. All solutions exist at stage m, the terminal stage, where m assignments have been made.

At step 88, graph 70 is searched for one or more optimum solutions. Only those portions of graph 70 touched by the search algorithm are formed. This greatly reduces the computations required to obtain an optimal solution for graph 70. For practical problems, the number of hypotheses in $n_h$, the set of all possible hypotheses, is so large that simply enumerating all arcs 66 on graph 70 is infeasible. This also precludes general dynamic programming approaches that provide high efficiency based upon a priori knowledge of the graph. One example of computational approach for performing the step 88 of searching graph 70 is described below in conjunction with FIG. 6A through 7.

Figure 6A:
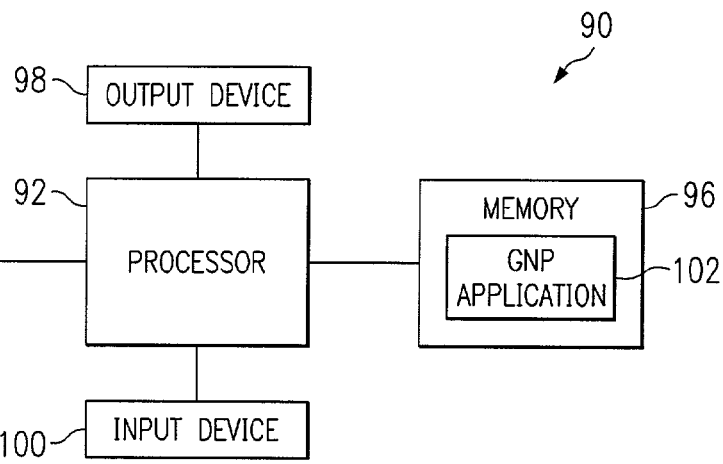
FIG. 6A is an example computer for solving the directed graph of FIG. 5B according to the teachings of the invention.

FIG. 6A is an example computer for searching the directed graph 70 for one or more optimal solutions according to the teachings of the invention. Computer 90 includes, in this example, a processor 92, associated storage 94, and memory 96. Also included in computer system 90 is an output device 98 and an input device 100. Processor 92 may be any suitable processor including processors manufactured by, for example, Intel, AMD, and Motorola. Storage 94 provides storage for processor 92 and may comprise any suitable type of storage, such as CD-ROM, hard disk drives, or other suitable storage. Memory 96 is often random access memory but can comprise other types of memory such as read only memory and may take any suitable form, including flash memory, CD-ROM, hard disk drives, floppy disks, or other suitable forms. Output device 98 may comprise any suitable device for displaying data processed by processor 92, such as a printer or a display. Input device 100 provides a way for a user to provide input to processor 92 and may include a keyboard, a pointing device, or other suitable input device.

Stored within memory 96, or alternatively storage 94, is GNP software 102. GNP software 102 solves the directed graph problem described above and therefore allows appropriate assignment of observations between two systems, such as systems 12 and 14. GNP software may be written in any suitable programming language; in this example it is written in C++. Operation of GNP software 102 is described in greater detail below in conjunction with FIG. 6B and FIG. 7.

Computer 90 is only one example of a suitable system for executing algorithmic steps for searching directed graph 70 for one or more optimal solutions. Other examples include digital signal processors, application specific integrated circuits, and field programmable gate arrays. Other suitable systems that are operable to execute predetermined steps according to the invention may also be used, whether currently existing or yet to be developed.

Figure 6B:
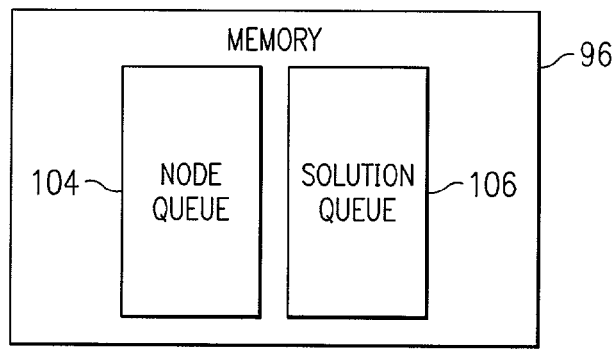
FIG. 6B is a block diagram of a portion of the memory of the example computer of FIG. 6A, showing a node queue and a solution queue used in solving the directed graph of FIG. 5B according to the teachings of the invention.

FIG. 6B shows additional details of memory 96 of this embodiment illustrating a node queue 104 and a solution queue 106 for use in searching the directed graph 70 for one or more optimal solutions according to the procedure described below in connection with FIG. 7. Node queue 104 stores all nodes 60 with partial hypothesis (stage<m) that have been touched in the search of graph 70 and are candidates for further exploration. Nodes 60 are pushed onto queue 104 in arbitrary order with respect to assignments, but retrieve highest scores first, as described in greater detail below. Solution queue 106 is a structure that maintains the list of the $n_{-best}$ solutions. Solution queue 106 supports adding solutions (nodes at stage n) in arbitrary order, popping a best order solution, and returning the value of the worst solution in solution queue 106. Popping the best or worst value solution refers to determining the solution with best or worst value, removing it from the queue, and making it available for further processing.

FIG. 7 is a flow chart illustrating example acts associated with solving the directed graph of FIG. 5B. Other known methods for solving a directed graph may also be used for this purpose. Method 110 may be implemented by any suitable computer to obtain the $n_{best}$ solutions for the directed graph 70 described above, and therefore determine the best set of observation assignments for the GNP problem. In general, method 110 maintains a list of nodes 60 (partial hypotheses) formed, and selects as the one to explore from that node those nodes having the highest current score. The search terminates when the selected node 60 for exploration has a score no higher than the $n^{th}$ best solution yet found. This assures finding the n best solutions because (1) all possible solutions are represented in the graph, (2) no child hypothesis has a score higher than its parent, and thus, (3) the termination criteria provides that all unexplored hypotheses would have scores no higher than the solutions already found. In the described embodiment only those nodes 60 in arcs 66 actually explored during the search are ever formulated.

The method begins at step 112. At step 114, the no assignment solution (the stage m node representing the hypothesis of no assignments) score from Equation 18 is pushed onto solution queue 106. This is the lowest possible score assignment hypothesis possible. At step 116, root node 64 is pushed onto node queue 104. Root node 64 corresponds to stage zero with no assignment decisions made and has a score of $-(m+1)\bar{g}$. Then, at decisional step 118, a determination is made of whether a node 60 on node queue 104 with the highest score has a score larger than the worst solution on solution queue 106. If so, processing continues at step 120. If not, processing is concluded at step 132.

At step 120, the best node 60 from node queue 104 is popped. As described above, popping refers to removing this solution from the queue and making it available as the starting point for further exploration. At step 124, m–s new hypotheses are formed from the node 60 on node queue 104. This node 60 has s decisions. The scores for these hypotheses are determined and the hypotheses whose score decrease exceeds $k_g \bar{g}$ (na>0) or $k_g \bar{g}_1$ (na=0), where $k_g \geq 1$ is a factor used to mitigate the order dependent gating artifacts described above are gated out.

At step 126 a determination is made of whether the new hypotheses are at stage m, the terminal stage. If so, the hypotheses that survived the gating tests at step 124 are pushed onto solution queue 106. Then solution queue 106 is reduced to hold at most $n_{best}$ solutions. This reduction refers to successively removing the worst solution as long as the queue holds more than $n_{best}$ solutions. If the new hypotheses are not at stage m (stage s is <m) the hypotheses that survived the gating at step 124 are pushed onto node queue 104 at step 130. Processing continues at step 118 until the node 60 on node queue 104 with the high score does not have a score larger than the worst solution on solution queue 106. In such a case, $n_{best}$ solutions on solution queue 106 represent the best solution, as denoted by step 132, and all scores have a score of $>=-(m+1)\bar{g}$.

The above approach may be utilized not only to find the N-best solutions for the GNP problem, but may also be used to generate the N-best solutions for the GNN problem, and may be more efficient than doing so using conventional techniques.

Example results of one embodiment of the present invention are described with reference to FIGS. 8 through 12. Comparisons of some embodiments of the present invention are made to an algorithm that solves the GNN problem described above. That algorithm used for the comparison data, called gnn-JVC, uses the Jonker-Volgenant-Castanon (JVC) algorithm to solve the cost matrix that results from application of equation 10. As this formulation assumes the sets of observations are unbiased (e.g., that $\bar{x}$=0), an ad-hoc solution is required. The approach used is to expand the covariance of the observations from A by the covariance of residual relative bias:

$$P_I^* = P_I + R \qquad (18)$$

A second algorithm, termed Magic-gnn is used to define an upper bound on expected performance. This is gnn-JVC but presented with the problem wherein the two sensors are in perfect registration due to the effects of a magical genie: in effect, R=0, and hence the problem is exactly the one for which gnn is designed.

All problems explored are in 3-D space (M=3) and have homogeneous covariances (all observations in A have variance P, all observations in B have variance Q). The simple bias formulation in equation 9 was used for the approach at the present invention, the log-determinant terms in the cost functions for equations 8 and 10 being constants for this case were instead added to the gate value g. Solution according to the teachings of the invention are referred to in the FIGURES as "gnpl."

Figure 8:
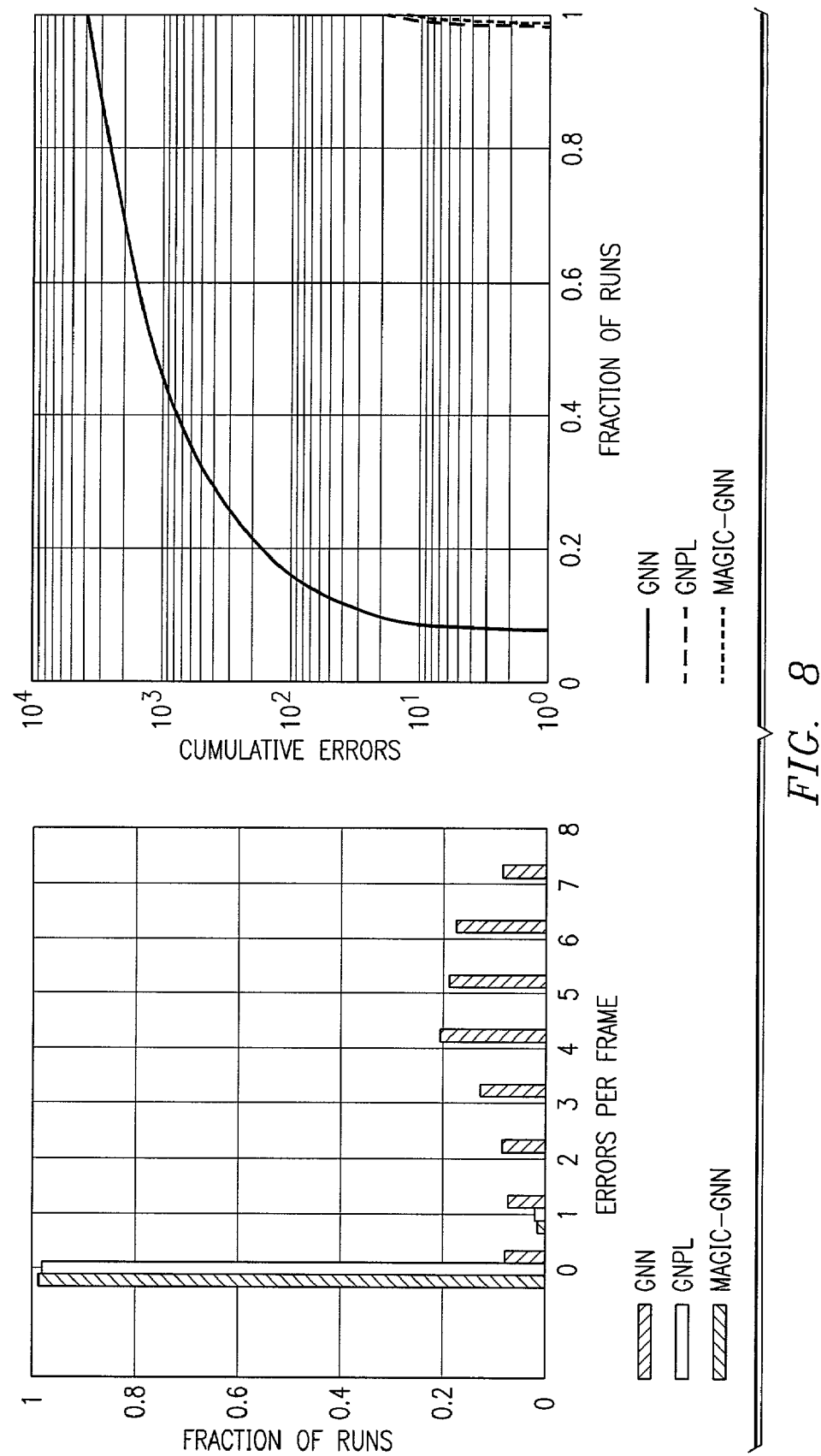
FIG. 8 illustrates graphs comparing the results of example assignments utilizing the teachings of the invention to a conventional approach for an example with no missing data.

FIG. 8 presents relative accuracy of the three algorithms for a threat object map handover problem. There are 20 total objects randomly dispersed in a cube 8 km on a side (the x, y, and z coordinates are independent draws from a uniform distribution), system A reports observations of seven of these to system B, and system B holds tracks on all 20 objects (thus m=7, n=N=20). The convolution of tracking errors for A and B is 100 meters 1-σ per axis, and there is a residual relative registration error of 2 km 1-σ. Thus, R is a diagonal matrix with values of 4 km² on the diagonal, and P+Q is diagonal with entries of 0.01 km² on the diagonal. The metric is assignment errors: there are seven assignments to be made with an error counted for each of the assignments that is incorrect compared to the true source of observations in A and B. The data is for 1000 Monte-Carlo runs. As shown, the approach of the present invention achieves almost the same performance as Magic-gnn, while gnn-JVC is much worse and clearly a poor choice for this problem.

Figure 9:
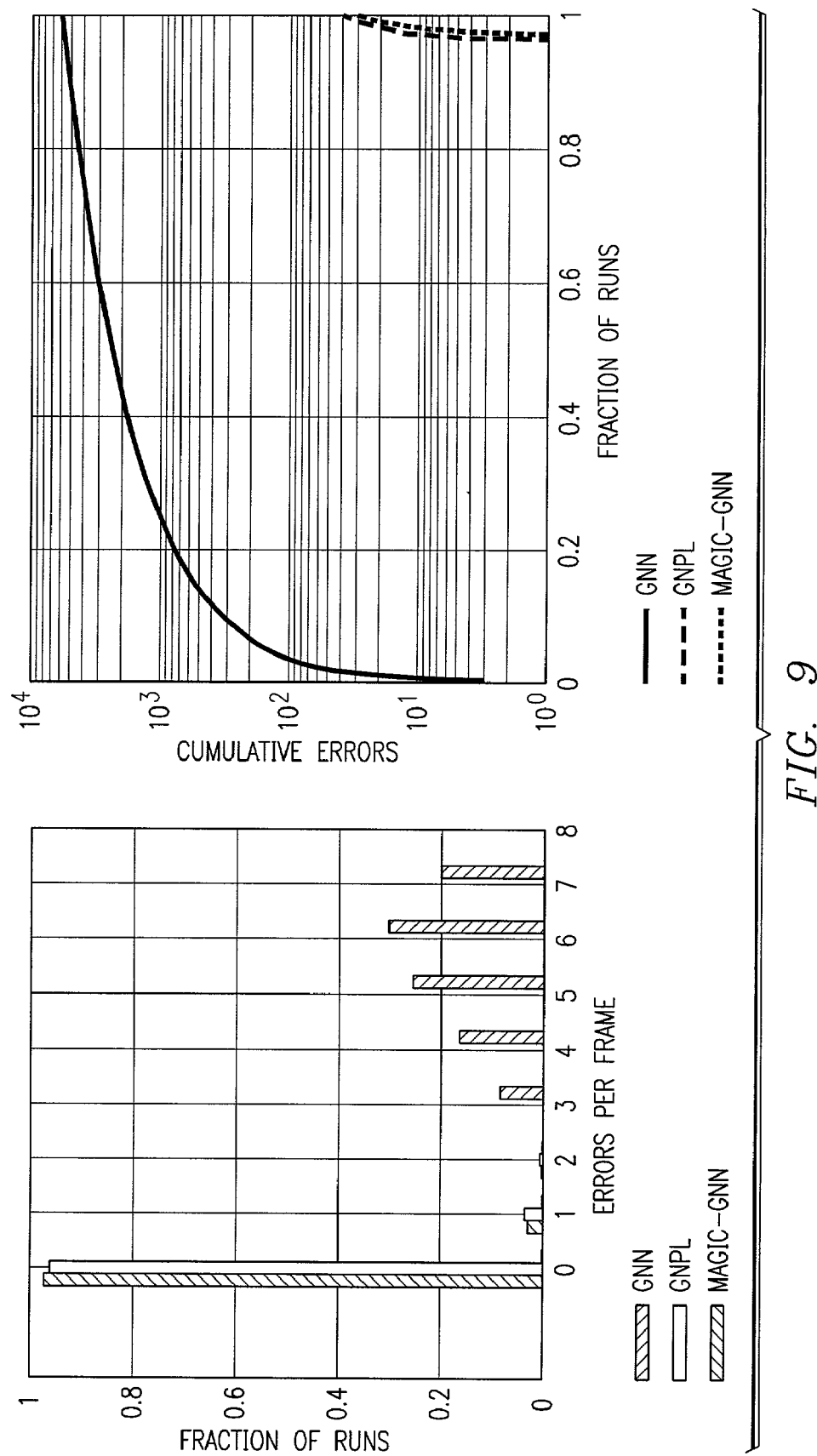
FIG. 9 illustrates graphs comparing the results of assignments utilizing the teachings of the invention to a conventional approach for an example having two missing observations.

The results in FIG. 9 are for a nearly identical problem, except that there are 22 objects: 2 of the 7 observations in A have no counterpart in the 20 observations in B (e.g., m=7, n=20, N=22). Performance degrades slightly for Magic-gnn and gnpl, but gnn-JVC never makes fewer than two errors (all seven objects as always assigned to something).

Figure 10:
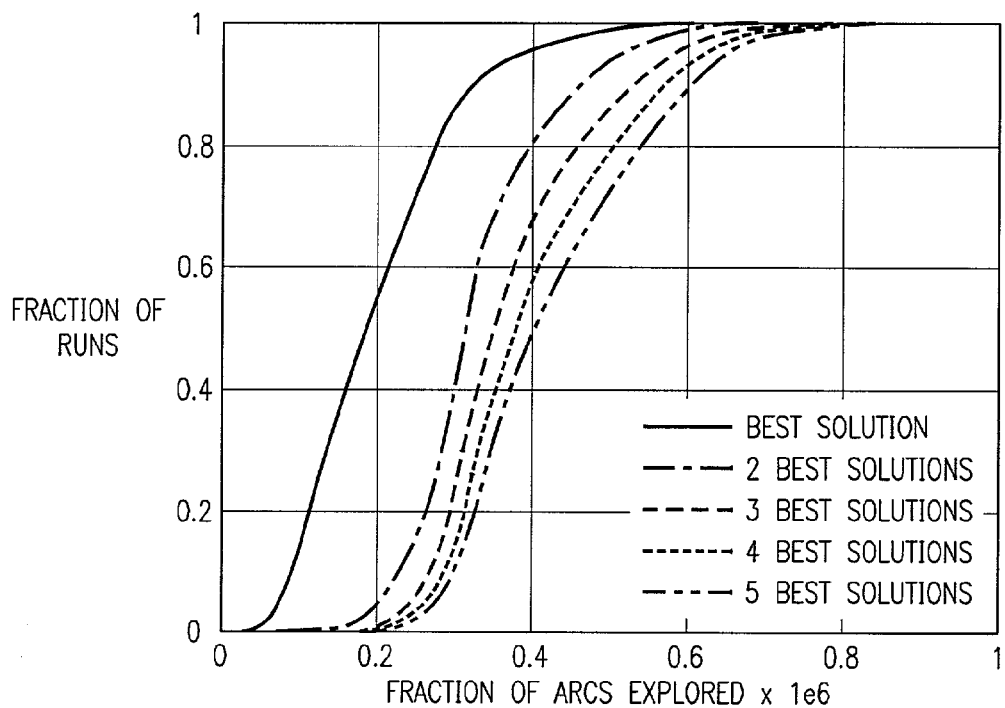
FIG. 10 is a graph illustrating the efficiency of solving the observation assignment problem according to the teachings of the invention.

FIG. 10 presents results from sets of 1000 Monte-Carlo runs solving the problem from FIG. 9, but now seeking varying numbers of solutions. The data presented shows the fraction of arcs in the directed graph touched by the search according to the teachings of the invention in finding the solutions. This problem has roughly $4.41 \times 10^9$ arcs, and in the worst case, about $1 \times 10^{-6}$ of those were searched, or roughly 4400 arcs, to find the five best solutions.

Figure 11:
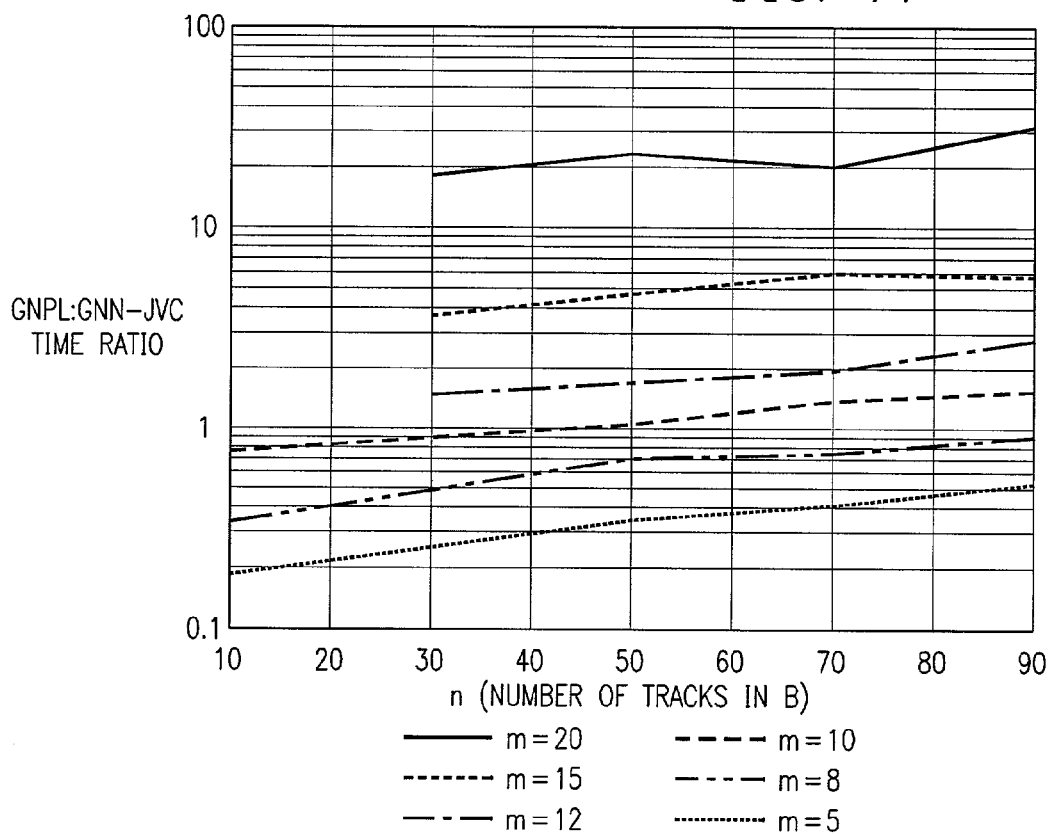
FIG. 11 is a graph comparing the timing of the solution according to the teachings of the present invention and prior techniques.

FIG. 11 provides another measure of computational performance, this time comparing total solution time for same size problems in gnpl and in gnn-JVC. The problem defined is has registration errors sufficiently small that solutions from both algorithms are identical. The particular problem parameters include:

100 meter 1-σ tracking error, 0.001 meter 1-σ Registration Error.

All objects in a cube, 8 km on a side. m observations in A, n observations in B.

The timing data is from 100 repetitions of 20 patterns for each combination of m/n.

Both algorithms are in C/C++. The gnn-JVC time includes time to compute the cost matrix. The cost calculation includes coarse gating to avoid computing the Mahalanobis distance for values unlikely to satisfy the gate g.

The key result shown in FIG. 11 is that gnpl is reasonably efficient computationally for problems typical of handover. For a map of size smaller than 10, gnpl is often significantly faster than gnn-JVC. For small problems, the gnn-JVC solution time is dominated by time to compute the cost matrix, not solution in the JVC algorithm. For these same cases, gnpl avoids exploring a large part of the directed graph, in effect using smart gating to avoid computing costs for many potential assignment pairs. This advantage disappears as m (e.g., the object map size) increases. The basic gnpl algorithm is useful in this example for values of m up to 25–30, depending upon object density, but could be used in much larger problems depending upon the specific computer used and the problem parameters.

One ad-hoc approach to solving problems of higher order builds on earlier work of Blackman and Banh[3]. Their approach is based upon iteration around a gnn algorithm. An assignment solution is obtained by gnn, the median offset between the assigned pairs in the solution is taken as the bias. The gnn solution is repeated with this new bias. This is repeated until some termination criteria is reached. This approach is reliant upon a good initial estimate of the bias. A hybrid approach using gnpl has been found successful. First, the gnpl assignment solution is found using some number (10 seems good) of the observations in A, chosen by some criteria (e.g., 10 points on the convex hull defined by A). The resulting bias estimate is used as the initial estimate for the iterative solution using gnn. A single iteration (gnpl to compute an initial bias, gnn assign, update the bias, gnn assign) achieves essentially the full performance for a number of cases tried. This method provides excellent performance for very large problems, with most of the experiments that support this description run using 60×120 assignment problems.

Figure 12:
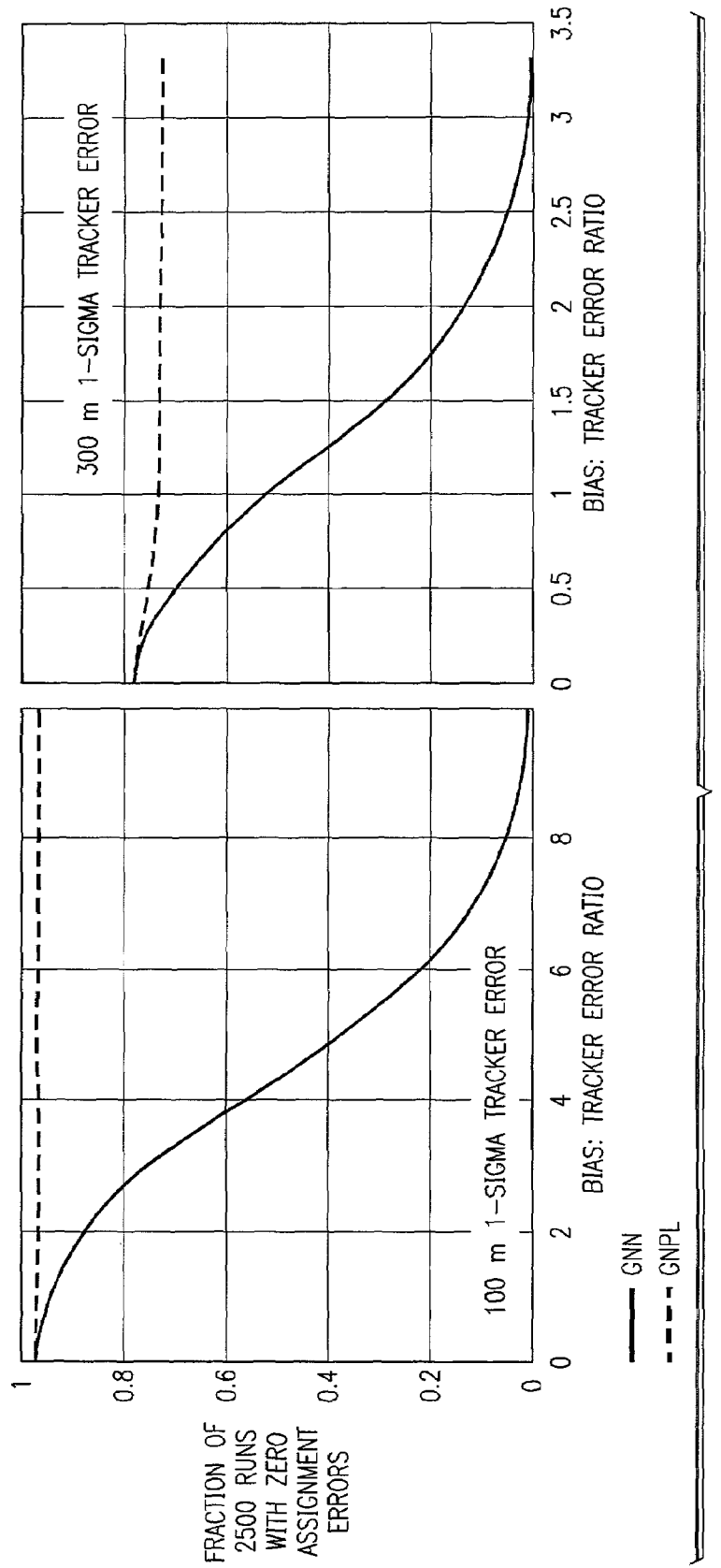
FIG. 12 illustrates graphs showing the limited circumstances under which prior techniques might be acceptable.

Finally, FIG. 12 presents the relative accuracy of assignments achieved for gnpl and gnn-JVC as a function of the ratio of bias (or registration) and tracker 1-σ values. The problem studied is a 7×20 assignment, this time with 21 actual objects, hence 1 of the 7 objects in A has no counterpart in B. For small tracking errors (the 100 meter 1-σ case), gnpl shows better accuracy for bias errors of about the same value. However, with a tracker error 3 times larger, gnpl shows a decided advantage beginning at a bias error less than half the tracker error.

Although the present invention has been described in detail, it should be understood that the various changes, substitutions, and alterations can be made hereto without departing from the spirit and scope of the invention as defined by the appended claims.

What is claimed is:

1. A computerized method for assigning observations comprising:

receiving a plurality of first observations indicative of respective physical positions observed by a first sensor system and receiving a plurality of second observations indicative of respective physical positions observed by a second sensor system;

assigning, by a computer, a set of pairs of the first and second observations predicted to correspond to the same physical position, the assigning comprising:

receiving a cost function that specifies a cost for each assigned pair, the cost not independent of the assignment of any other assigned pairs in the set of assigned pairs; and determining the set of assigned pairs corresponding to an optimal value for the cost function by calculating, by the computer, a corresponding optimal value for a directed graph representative of possible assignments of first and second observations.

2. The method of claim 1, wherein the directed graph comprises a plurality of nodes each representing an assignment hypothesis, the plurality of nodes comprising a root node, wherein each node except for the root node has an associated input arc representing an assignment decision and wherein the length of each input arc is representative of a change in an assignment score resulting from the assignment decision, wherein the plurality of nodes are grouped in a plurality of stages.

3. The method of claim 1, wherein calculating, by the computer, a corresponding optimal value for a directed graph representative of possible assignments of first and second observations comprises calculating the optimal value by a network shortest path algorithm.

4. The method of claim 1, wherein calculating, by the computer, a corresponding optimal value for a directed graph representative of possible assignments of first and second observations comprises calculating the optimal value by a Dijkstra algorithm.

5. The method of claim 1, wherein the cost function is $$J_s - \bar{x}^T R^{-1} \bar{x} - \sum_{i=1}^{s} \left\{ \begin{array}{ll} \delta x_i^T S_i^{-1} \delta x_i + \ln[|S_i|] + \ln(d_{min}) & a(i) \neq 0 \\ \bar{g} & a(i) = 0 \end{array} \right\} +$$

$$\left\{ \begin{array}{ll} \ln([2\pi]^M |R|) & n_a = 0 \\ 0 & n_a > 0 \end{array} \right\}$$

wherein
- $J_s$=Assignment score
- $\bar{x}$=Estimate of relative bias
- R=Relative registration covariance matrix
- $\delta x_i$=State vector difference=$A_i - B_{a(i)} - \bar{x}$
- $S_i$=Residual error covariance for pair $A_i$ and $B_{a(i)}$
- $d_{min}$=Minimum determinant of a residual error matrix
- g=Gate value
- M=Number of first observations
- $n_a$=Number of non-zero entries in a
- a=Assignment vector: $a_{(i)} > 0 \rightarrow A_i$ is assigned to $B_{a(i)}$
- $A_i$=The plurality of first observations
- $B_{a(i)}$=The plurality of second observations assigned to $A_i$.

6. The method of claim 5, wherein the relative bias, $\bar{x}$, of the cost function is a simple bias.

7. The method of claim 5, wherein the relative bias, $\bar{x}$, of the cost function is a functional bias.

8. The method of claim 1, wherein assigning, by a computer, comprises assigning by a processor operable to execute a computer program stored on a computer readable medium.

9. The method of claim 1, wherein assigning, by a computer, comprises assigning by an application specific integrated circuit.

10. The method of claim 1, wherein assigning, by a computer, comprises assigning by a digital signal processor.

11. A computerized method for determining the Nbest observation assignments comprising:
  receiving a plurality of first observations indicative of respective physical positions observed by a first sensor system and receiving a plurality of second observations indicative of respective physical positions observed by a second sensor system;
  determining, by a computer, one or more sets of pairs of the first and second observations predicted to correspond to the same physical position, the determining comprising:
    receiving a cost function that specifies a cost for each assigned pair;
    determining a set of assigned pairs corresponding to an optimal value for the cost function by calculating, by the computer, a corresponding optimal value for a directed graph representative of possible assignments of corresponding first and second observations; and
    repeating the determining act until a desired number of best observation assignments is determined.

12. The method of claim 11, wherein the cost specified by the cost function for each assigned pair is not independent of the assignment of any other assigned pairs in the respective set of assigned pairs.

13. The method of claim 11, wherein the directed graph comprises a plurality of nodes each representing an assignment hypothesis, the plurality of nodes comprising a root node, wherein each node except for the root node has an associated input arc representing an assignment decision and wherein the length of each input arc is representative of a change in an assignment score resulting from the assignment decision, wherein the plurality of nodes are grouped in a plurality of stages.

14. The method of claim 11, wherein calculating, by the computer, a corresponding optimal value for a directed graph representative of possible assignments of first and second observations comprises calculating the optimal value by a network shortest path algorithm.

15. The method of claim 11, wherein calculating, by the computer, a corresponding optimal value for a directed graph representative of possible assignments of first and second observations comprises calculating the optimal value by a Dijkstra algorithm.

16. The method of claim 11, wherein the cost function is $$J_s - \bar{x}^T R^{-1} \bar{x} - \sum_{i=1}^{s} \left\{ \begin{array}{ll} \delta x_i^T S_i^{-1} \delta x_i + \ln[|S_i|] + \ln(d_{min}) & a(i) \neq 0 \\ \bar{g} & a(i) = 0 \end{array} \right\} +$$

$$\left\{ \begin{array}{ll} \ln([2\pi]^M |R|) & n_a = 0 \\ 0 & n_a > 0 \end{array} \right\}$$

wherein
- $J_s$=Assignment score
- $\bar{x}$=Estimate of relative bias
- R=Relative registration covariance matrix
- $\delta x_i$=State vector difference=$A_i B_{a(i)} - \bar{x}$
- $S_i$=Residual error covariance for pair $A_i$ and $B_{a(i)}$
- $d_{min}$=Minimum determinant of residual error matrix
- g=Gate value
- M=Number of first observations
- $n_a$=Number of non-zero entries in a
- a=Assignment vector: $a_{(i)} > 0 A_i$ is assigned to $B_{a(i)}$
- $A_i$=The plurality of first observations
- $B_{a(i)}$=The plurality of second observations assigned to $A_i$.

17. The method of claim 16, wherein the relative bias, $\bar{x}$, f the cost function is a simple bias.

18. The method of claim 16, wherein the relative bias, $\bar{x}$, of the cost function is a functional bias.

19. The method of claim 11, wherein assigning, by a computer, comprises assigning by a processor operable to execute a computer program stored on a computer readable medium.

20. The method of claim 11, wherein assigning, by a computer, comprises assigning by an application specific integrated circuit.

21. The method of claim 11, wherein assigning, by a computer, comprises assigning by a digital signal processor.

22. A system for assigning observations comprising: a computer readable medium; and
  a computer program stored on the computer readable medium, the computer program operable, when executed on a processor, to:
    receive a plurality of first observations indicative of respective physical positions observed by a first sensor system and receiving a plurality of second observations indicative of respective physical positions observed by a second sensor system;
    assign a set of pairs of the first and second observations predicted to correspond to the same physical position, the assignment comprising:

receiving a cost function that specifies a cost for each assigned pair, the cost not independent of the assignment of any other assigned pairs in the set of assigned pairs; and determining the set of assigned pairs corresponding to an optimal value for the cost function by calculating, by the computer, a corresponding optimal value for a directed graph representative of possible assignments of first and second observations.

23. The system of claim 22, and further comprising a processor operable to execute the computer program.

24. The system of claim 22, wherein the directed graph comprises a plurality of nodes each representing an assignment hypothesis, the plurality of nodes comprising a root node, wherein each node except for the root node has an associated input arc representing an assignment decision and wherein the length of each input arc is representative of a change in an assignment score resulting from the assignment decision, wherein the plurality of nodes are grouped in a plurality of stages.

25. The system of claim 22, wherein calculating, by the computer, a corresponding optimal value for a directed graph representative of possible assignments of first and second observations comprises calculating the optimal value by a network shortest path algorithm.

26. The system of claim 22, wherein calculating, by the computer, a corresponding optimal value for a directed graph representative of possible assignments of first and second observations comprises calculating the optimal value by a Dijkstra algorithm.

27. The system of claim 26, wherein the cost function is $$J_s - \bar{x}^T R^{-1} \bar{x} - \sum_{i=1}^{s} \left\{ \begin{array}{ll} \delta x_i^T S_i^{-1} \delta x_i + \ln[|S_i|] + \ln(d_{\min}) & a(i) \neq 0 \\ g & a(i) = 0 \end{array} \right\} +$$

$$\left\{ \begin{array}{ll} \ln([2\pi]^M |R|) & n_a = 0 \\ 0 & n_a > 0 \end{array} \right\}$$

wherein
$J_s$=Assignment score
$\bar{x}$=Estimate of relative bias
R=Relative registration covariance matrix
$\delta x_i$=State vector difference=$A_i - B_{a(i)} - \bar{x}$
$S_i$=Residual error covariance for pair $A_i$ and $B_{a(i)}$
$d_{min}$=Minimum determinant of a residual error matrix
g=Gate value
M=Number of fist observations
$n_a$=Number of non-zero entries in a
a=Assignment vector: $a_{(i)} > 0 A_i$ is assigned to $B_{a(i)}$
$A_i$=The plurality of first observations
$B_{a(i)}$=The plurality of second observations assigned to $A_i$.

28. The system of claim 27, wherein the relative bias, x, of the cost function is a simple bias.

29. The system of claim 22, wherein the cost function is $$J_s - \bar{x}^T R^{-1} \bar{x} - \sum_{i=1}^{s} \left\{ \begin{array}{ll} \delta x_i^T S_i^{-1} \delta x_i + \ln[|S_i|] + \ln(d_{\min}) & a(i) \neq 0 \\ g & a(i) = 0 \end{array} \right\} +$$

$$\left\{ \begin{array}{ll} \ln([2\pi]^M |R|) & n_a = 0 \\ 0 & n_a > 0 \end{array} \right\}$$

wherein
$J_s$=Assignment score
$\bar{x}$=Estimate of relative bias
R=Relative registration covariance matrix
$\delta x_i$=State vector difference=$A_i - B_{a(i)} - \bar{x}$
$S_i$=Residual error covariance for pair $A_i$ and $B_{a(i)}$
$d_{min}$=Minimum determinant of a residual error matrix
g=Gate value
M=Number of first observations
$n_a$=Number of non-zero entries in a
a=Assignment vector: $a_{(i)} > 0 \rightarrow A_i$ is assigned to $B_{a(i)}$
$A_i$=The plurality of first observations
$B_{a(i)}$=The plurality of second observations assigned to $A_i$.

30. The system of claim 29, wherein the relative bias, x, of the cost function is a simple bias.

31. A system for assigning observations comprising: a computer operable to receive a plurality of first observations indicative of respective physical positions observed by a first sensor system and receiving a plurality of second observations indicative of respective physical positions observed by a second sensor system; and wherein the computer is further operable to assign a set of pairs of the first and second observations predicted to correspond to the same physical position, the assignment comprising:

receiving a cost function that specifies a cost for each assigned pair, the cost not independent of the assignment of any other assigned pairs in the set of assigned pairs; and determining the set of assigned pairs corresponding to an optimal value for the cost function by calculating, by the computer, a corresponding optimal value for a directed graph representative of possible assignments of first and second observations.

32. The system of claim 31, wherein the computer comprising an application specific integrated circuit.

33. The system of claim 31, wherein the computer comprises a processor operable to execute a computer program stored on the computer readable medium.

34. The system of claim 31, wherein the computer further comprises the computer readable medium.

35. The system of claim 31, wherein the computer comprises a digital signal processor.

36. The system of claim 31, wherein the computer comprises a field programmable gate array.

37. The system of claim 31, wherein the computer comprises a means for computing.

38. The system of claim 31, wherein the directed graph comprises a plurality of nodes each representing an assignment hypothesis, the plurality of nodes comprising a root node, wherein each node except for the root node has an associated input arc representing an assignment decision and wherein the length of each input arc is representative of a change in an assignment score resulting from the assignment decision, wherein the plurality of nodes are grouped in a plurality of stages.

39. The system of claim 31, wherein calculating, by the computer, a corresponding optimal value for a directed graph representative of possible assignments of first and second observations comprises calculating the optimal value by a network shortest path algorithm.

40. The system of claim 31, wherein calculating, by the computer, a corresponding optional value for a directed graph representative of possible assignments of first and second observations comprises calculating the optimal value by a Dijkstra algorithm.

* * * * *

UNITED STATES PATENT AND TRADEMARK OFFICE
CERTIFICATE OF CORRECTION

PATENT NO.       : 7,092,924 B1
APPLICATION NO.  : 10/086988
DATED            : August 15, 2006
INVENTOR(S)      : Mark D. Levedahl It is certified that error appears in the above-identified patent and that said Letters Patent is hereby corrected as shown below:

Column 5:
Line 38, after "of these subject to:" delete "m≦n≦N" and insert -- m≤n≤N --.

Column 6:
Line 19, delete Equation (5) and insert -- $\forall (i \neq j \text{ and } a(j) > 0)$ --.

Line 27, delete Equation (6) and insert $$P_a = \frac{e^{-\bar{x}^T R^{-1} \bar{x}/2}}{(2\pi)^{M/2} \sqrt{|R|}} \prod_i^m \frac{e^{-[A_i - B_{a(i)} - \bar{x}]^T (P_i + Q_{a(i)})^{-1} [A_i - B_{a(i)} - \bar{x}]/2}}{(2\pi)^{M/2} \sqrt{|P_i + Q_{a(i)}|}}$$

-- --.

Column 8:
Line 19, delete Equation (11) and insert $$g = 2\ln\left[\frac{\beta_i P_{TA} P_{TB}}{(2\pi)^{M/2} P_{NTA} P_{NTB}}\right]$$
$$P_{NTA} = \beta_i P_{TB}(1 - P_{TA}) + \beta_{FTB}$$
$$P_{NTB} = \beta_i P_{TA}(1 - P_{TB}) + \beta_{FTA}$$

-- --.

Line 39, delete Equation (12) and insert $$\delta f_i^2 = [A_i^f - B_{a(i)}^f]^T (F_{i,a(i)})^{-1} [A_i^f - B_{a(i)}^f] + \ln(|F_{i,a(i)}|)$$
$$J_{af} = -\bar{x}^T R^{-1} \bar{x} - \ln[(2\pi)^M |R|] - \sum_{i=1}^m \left\{ \begin{array}{ll} \delta x_i^T S_i^{-1} \delta x_i + \ln[|S_i|] + \delta f_i^2 & a(i) \neq 0 \\ g & a(i) = 0 \end{array} \right\}$$

-- --.

Column 8:
Line 53, after "make k assignments," delete "0≦k≦m" and insert -- 0≤k≤m --.

Signed and Sealed this

Fourteenth Day of September, 2010

David J. Kappos
*Director of the United States Patent and Trademark Office*

Column 9:
Line 53, delete Equation (17) and insert $$J_s - \bar{x}^T R^{-1} \bar{x} - \sum_{i=1}^{s} \left\{ \begin{array}{ll} \delta x_i^T S_i^{-1} \delta x_i + \ln\lvert S_i \rvert \rvert - \ln(d_{min}) & a(i) \neq 0 \\ \bar{g} & a(i) = 0 \end{array} \right\} + \left\{ \begin{array}{ll} \ln([2\pi]^M \lvert R \rvert) & n_a = 0 \\ 0 & n_a > 0 \end{array} \right\}$$

--.

Column 12:
Line 22, after "where" delete "k$_g$≧1" and insert -- $k_g \geq 1$ --.
Line 56, delete Equation (18) and insert $$P_i = P_i + R$$

--.

Column 14:
Line 58, Claim 2, after "associated input" delete "are" and insert -- arc --.

Column 15:
Line 8, Claim 5, delete the equation found after "the cost function is" and insert $$J_s - \bar{x}^T R^{-1} \bar{x} - \sum_{i=1}^{s} \left\{ \begin{array}{ll} \delta x_i^T S_i^{-1} \delta x_i + \ln\lvert S_i \rvert \rvert - \ln(d_{min}) & a(i) \neq 0 \\ \bar{g} & a(i) = 0 \end{array} \right\} + \left\{ \begin{array}{ll} \ln([2\pi]^M \lvert R \rvert) & n_a = 0 \\ 0 & n_a > 0 \end{array} \right\}$$

--.

Column 16:
Line 20, Claim 16, delete the equation found after "the cost function is" and insert $$J_s - \bar{x}^T R^{-1} \bar{x} - \sum_{i=1}^{s} \left\{ \begin{array}{ll} \delta x_i^T S_i^{-1} \delta x_i + \ln\lvert S_i \rvert \rvert - \ln(d_{min}) & a(i) \neq 0 \\ \bar{g} & a(i) = 0 \end{array} \right\} + \left\{ \begin{array}{ll} \ln([2\pi]^M \lvert R \rvert) & n_a = 0 \\ 0 & n_a > 0 \end{array} \right\}$$

--.

Column 16:
Line 42, Claim 17, after $\bar{X}$, delete "o the cost" and insert -- of the cost --.

Column 17:
Line 34, Claim 27, delete the equation found after "the cost function is" and insert $$J_s - \bar{x}^T R^{-1} \bar{x} - \sum_{i=1}^{s} \left\{ \begin{array}{ll} \delta x_i^T S_i^{-1} \delta x_i + \ln\lvert S_i \rvert \rvert - \ln(d_{min}) & a(i) \neq 0 \\ \bar{g} & a(i) = 0 \end{array} \right\} + \left\{ \begin{array}{ll} \ln([2\pi]^M \lvert R \rvert) & n_a = 0 \\ 0 & n_a > 0 \end{array} \right\}$$

--.

Line 48, after "M=Number of" delete "fist" and insert -- first --.

Line 50, delete the equation after "a=Assignment vector:" and insert -- $a_{(i)} > 0 \rightarrow A_i$ --.

Line 57, Claim 29, delete the equation found after "the cost function is" and insert $$J_s - \bar{x}^T R^{-1} \bar{x} - \sum_{i=1}^{s} \left\{ \begin{array}{ll} \delta x_i^T S_i^{-1} \delta x_i + \ln\lvert S_i \rvert \rvert - \ln(d_{min}) & a(i) \neq 0 \\ \bar{g} & a(i) = 0 \end{array} \right\} + \left\{ \begin{array}{ll} \ln([2\pi]^M \lvert R \rvert) & n_a = 0 \\ 0 & n_a > 0 \end{array} \right\}$$

--.